US012684102B2

(12) United States Patent
Konttori et al.

(10) Patent No.: US 12,684,102 B2
(45) Date of Patent: Jul. 14, 2026

(54) HIGH EFFICIENCY BACKLIGHT FOR MULTISCOPIC DISPLAY

(71) Applicant: Distance Technologies Oy, Helsinki (FI)

(72) Inventors: Urho Konttori, Helsinki (FI); Petri Savolainen, Espoo (FI); Mikko Strandborg, Hangonkylä (FI); Mikko Juhola, Muurla (FI)

(73) Assignee: Distance Technologies Oy, Helsinki (FI)

( * ) Notice: Subject to any disclaimer, the term of this patent is extended or adjusted under 35 U.S.C. 154(b) by 91 days.

(21) Appl. No.: 18/810,752

(22) Filed: Aug. 21, 2024

(65) Prior Publication Data

US 2025/0324023 A1     Oct. 16, 2025

Related U.S. Application Data

(63) Continuation-in-part of application No. 18/636,976, filed on Apr. 16, 2024, now Pat. No. 12,113,956.

(51) Int. Cl.
| | |
|---|---|
| *H04N 13/315* | (2018.01) |
| *G02F 1/1335* | (2006.01) |
| *G02F 1/13357* | (2006.01) |
| *H04N 13/383* | (2018.01) |
| *H04N 13/398* | (2018.01) |

(52) U.S. Cl.
CPC ..... *H04N 13/315* (2018.05); *G02F 1/133541* (2021.01); *G02F 1/133607* (2021.01); *G02F 1/13362* (2013.01); *H04N 13/383* (2018.05); *H04N 13/398* (2018.05)

(58) Field of Classification Search
CPC .. H04N 13/315; H04N 13/383; H04N 13/398; G02F 1/133607; G02F 1/133541; G02F 1/13362
See application file for complete search history.

(56) References Cited

U.S. PATENT DOCUMENTS

| | | | | |
|---|---|---|---|---|
| 10,989,926 | B1 * | 4/2021 | Matsuda | .............. G02B 27/283 |
| 11,849,103 | B2 * | 12/2023 | Kusafuka | .............. G02B 30/31 |
| 2005/0146787 | A1 | 7/2005 | Lukyanitsa | |
| 2014/0320614 | A1 | 10/2014 | Gaudreau et al. | |

(Continued)

OTHER PUBLICATIONS

European Patent Office, Extended European Search Report, Application No. 25168151.6, mailed Jul. 28, 2025, 10 pages.

(Continued)

*Primary Examiner* — Mohamed A. Wasel
(74) *Attorney, Agent, or Firm* — Ziegler IP Law Group, LLC.

(57)     ABSTRACT

A backlight unit for a liquid crystal display device is disclosed. The backlight unit includes an array of light-emitting elements and a plurality of cavity reflectors, wherein a given cavity reflector partially surrounds a corresponding light-emitting element of said array. The backlight unit further includes a collimator arranged on an optical path of the array of light-emitting elements, a first drive circuit that is employed to individually control the light-emitting elements of said array, and a controller. The controller is configured to generate or receive drive signals for controlling the light-emitting elements of said array, and send the drive signals to the first drive circuit.

17 Claims, 7 Drawing Sheets

(56)                    References Cited

U.S. PATENT DOCUMENTS

| 2016/0105665 A1* | 4/2016 | Wang ................. G02B 27/0093 |
| | | 348/55 |
| 2018/0081183 A1 | 3/2018 | Lu et al. |
| 2021/0027677 A1 | 1/2021 | Jiang et al. |
| 2021/0200026 A1* | 7/2021 | Sonobe ............. G02F 1/133605 |
| 2021/0344893 A1* | 11/2021 | Kusafuka ............. H04N 13/383 |
| 2022/0214542 A1 | 7/2022 | Fang et al. |
| 2023/0005399 A1 | 1/2023 | Kusafuka et al. |

OTHER PUBLICATIONS

European Patent Office, Extended European Search Report, Application No. 25168159.9, mailed Aug. 12, 2025, 11 pages.

\* cited by examiner

HIGH EFFICIENCY BACKLIGHT FOR MULTISCOPIC DISPLAY

CROSS-REFERENCE TO RELATED APPLICATIONS

This application is a continuation-in-part of U.S. patent application Ser. No. 18/636,976, titled "MULTISCOPIC DISPLAY USING STACKED LIQUID CRYSTAL LAYERS" and filed on Apr. 16, 2024, which is incorporated herein by reference.

TECHNICAL FIELD

The present disclosure relates to high efficiency backlight units that are suitable for autostereoscopic and multiscopic displays. The present disclosure also relates to liquid crystal display devices incorporating such backlight units. The present disclosure further relates to systems incorporating such liquid crystal display devices for producing autostereoscopic and multiscopic displays.

BACKGROUND

Heads-up displays (HUDs) that project images on vehicle windshields or other windows need to work in various lighting conditions, for example, ranging from direct sunlight to dimly-lit night conditions. An especially challenging situation is when an outdoor lighting condition is very bright (for example, when an average intensity of ambient light lies in a range of 10000 lux to 25000 lux). In such challenging situations, a liquid crystal display (LCD) based HUD having a conventional edge-lit backlight unit may not be capable of achieving brightness levels that can produce a legible image. This problem is exacerbated when an area on which images are projected is relatively large (for example, when a field of view of said area lies in a range of 20 degrees×20 degrees to 60 degrees×25 degrees, or even more). This is because in such situations, a limited number of photo-emitting cells in the LCD based HUD are utilised to display the images on a relatively larger area, which means that light produced by a single pixel has to cover a relatively larger pixel area, thereby reducing an overall brightness of the displayed images.

To add to this, in case of 3D HUDs, where a light field display unit comprises a multiscopic optical element (for example, such as a parallax barrier, a lenticular array, an array of liquid crystal lenses, or similar) for producing an autostereoscopic effect, the overall brightness of displayed images is further reduced. Combined with the challenges of an LCD based HUD, such multiscopic optical elements may not allow to achieve sufficient brightness levels that can produce legible images. This may be even more problematic when a dark visual scene is required to be presented.

It is well known that low brightness levels can make it difficult for users to discern visual details and perceive colours in the displayed images. This can lead to eyestrain and reduced usability, as users may struggle to perceive a 3D visual scene.

Therefore, in light of the foregoing discussion, there exists a need to overcome the aforementioned problems.

SUMMARY

The present disclosure seeks to provide backlight units that are capable of producing high brightness suitable for autostereoscopic and multiscopic displays. The present disclosure also seeks to provide liquid crystal display devices incorporating such backlight units, and systems incorporating such liquid crystal display devices for producing autostereoscopic and multiscopic displays, even with a relatively wide field of view (for example, in a range of 20 degrees×20 degrees to 60 degrees×25 degrees, or even more). The aim of the present disclosure is achieved by backlight units, liquid crystal display devices, and systems for producing autostereoscopic and multiscopic displays, as defined in the appended independent claims to which reference is made to. Advantageous features are set out in the appended dependent claims.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

BRIEF DESCRIPTION OF THE DRAWINGS

FIGS. 2A and 2B are cross-sectional views of an LCD device, in accordance with different embodiments of the present disclosure; while

DETAILED DESCRIPTION OF EMBODIMENTS

Figure 1:
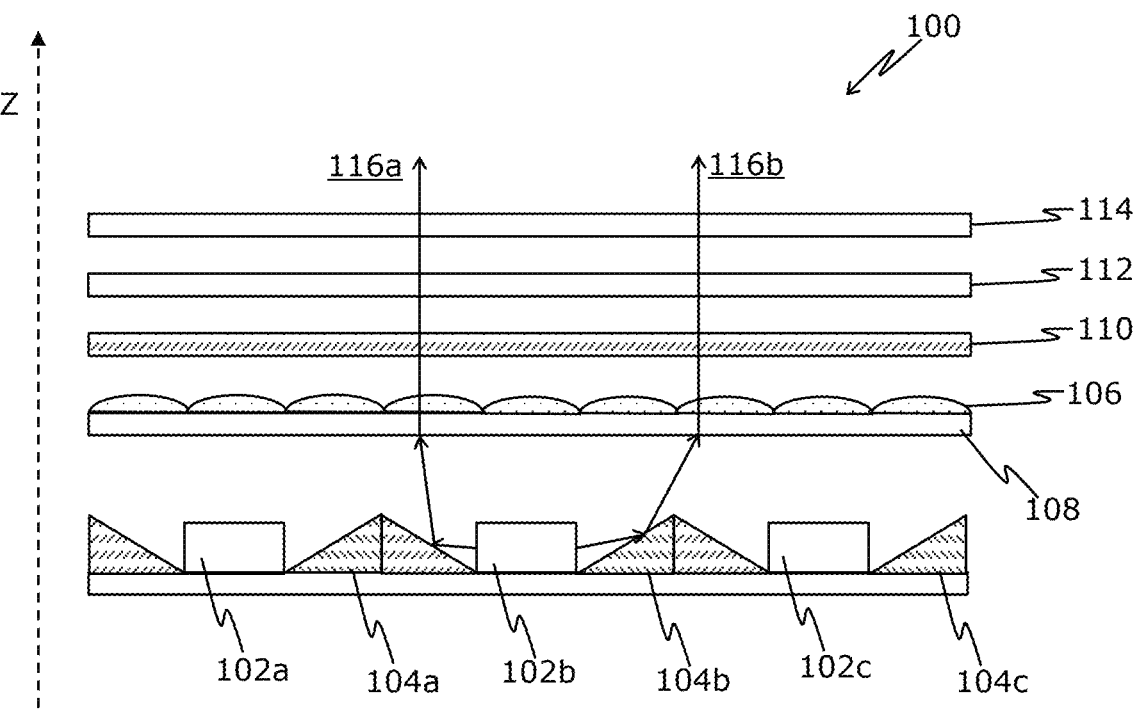
FIG. 1 is a cross-sectional view of a backlight unit for a liquid crystal display (LCD) device, in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, an embodiment of the present disclosure provides a backlight unit for a liquid crystal display device, the backlight unit comprising:

an array of light-emitting elements;

a plurality of cavity reflectors, wherein a given cavity reflector partially surrounds a corresponding light-emitting element of said array;

a collimator arranged on an optical path of the array of light-emitting elements;

a first drive circuit that is employed to individually control the light-emitting elements of said array; and a controller configured to:

generate or receive drive signals for controlling the light-emitting elements of said array; and send the drive signals to the first drive circuit.

The present disclosure provides the aforementioned backlight unit that is capable of producing high brightness suitable for autostereoscopic and multiscopic display purposes. In the backlight unit, the light-emitting elements of said array are partially surrounded by respective ones of the plurality of cavity reflectors. A synergistic effect of employing the plurality of cavity reflectors along with the collimator is that light emanating from the light-emitting elements is reflected by the cavity reflectors towards the collimator, which then aligns the light along an optical axis of the backlight unit. This allows for utilising a maximum amount of the light emanating from the light-emitting elements to usefully produce high brightness. It is noteworthy that without such a synergistic arrangement of the plurality of cavity reflectors and the collimator, the light emanating from the light-emitting elements would be directed in almost all directions, thereby wasting a large amount of said light and producing relatively low brightness that is not suitable for autostereoscopic and multiscopic display purposes.

In a second aspect, an embodiment of the present disclosure provides a liquid crystal display device comprising:

a backlight unit according to the aforementioned first aspect;

a first polarizer and a second polarizer having a first polarization orientation and a second polarization orientation, respectively, wherein the first polarizer is arranged between the backlight unit and the second polarizer;

at least one liquid crystal (LC) layer arranged between the first polarizer and the second polarizer, the at least one LC layer comprising a plurality of LC cells;

a second drive circuit that is employed to individually control the plurality of LC cells of the at least one LC layer; and a processor configured to:

generate drive signals for controlling the plurality of LC cells of the at least one LC layer; and send the drive signals to the second drive circuit, wherein the plurality of LC cells of the at least one LC layer are controlled individually by the second drive circuit using the drive signals, to adjust a polarization of light passing therethrough, for producing a synthetic light field.

The present disclosure also provides the aforementioned liquid crystal display (LCD) device that incorporates the backlight unit of the aforementioned first aspect. Due to the capability of the backlight unit to produce high brightness (due to minimised wastage of light), the LCD device is susceptible to be utilised in a heads-up display (HUD) (namely for projecting images on a windshield or other window(s) of a vehicle) in various lighting conditions, for example, ranging from bright daylight conditions to dimly-lit night conditions. Notably, the LCD device can be employed to produce legible images even when an outdoor lighting condition is very bright (for example, when an average intensity of ambient light lies in a range of 10000 lux to 25000 lux), and when an area on which the images are projected is relatively large (for example, when a field of view (FOV) of said area lies in a range of 20 degrees×20 degrees to 60 degrees×25 degrees, or even more). Moreover, the LCD device can be implemented even in a three-dimensional (3D) HUD to facilitate an autostereoscopic and multiscopic display.

In a third aspect, an embodiment of the present disclosure provides a system comprising:

a liquid crystal display device comprising:

a backlight unit according to the aforementioned first aspect;

a first polarizer and a second polarizer having a first polarization orientation and a second polarization orientation, respectively, wherein the first polarizer is arranged between the backlight unit and the second polarizer;

at least one liquid crystal (LC) layer arranged between the first polarizer and the second polarizer, the at least one LC layer comprising a plurality of LC cells; and a second drive circuit that is employed to individually control the plurality of LC cells of the at least one LC layer;

an optical combiner arranged on an optical path of the liquid crystal display device and on an optical path of a real-world light field of a real-world environment; and at least one processor configured to:

generate drive signals for controlling the plurality of LC cells of the at least one LC layer; and send the drive signals to the second drive circuit, wherein the plurality of LC cells of the at least one LC layer are controlled individually by the second drive circuit using the drive signals, to adjust a polarization of light passing therethrough, for producing a synthetic light field, and wherein the optical combiner is employed to reflect the synthetic light field towards eyes of at least one user, whilst optically combining the real-world light field with the synthetic light field.

The present disclosure further provides the aforementioned system comprising the LCD device that incorporates the backlight unit of the aforementioned first aspect along with the optical combiner. Due to the capability of the backlight unit to produce high brightness (due to minimised wastage of light), the system is susceptible to be implemented as an HUD. Notably, the system can be employed to produce legible images even when an outdoor lighting condition is very bright (for example, when the average intensity of ambient light lies in a range of 10000 lux to 25000 lux), and when an area of the optical combiner on to which the images are projected is relatively large (for example, when an FOV of said area lies in a range of 20 degrees×20 degrees to 60 degrees×25 degrees, or even more). Moreover, the system can be implemented as a 3D HUD to facilitate an autostereoscopic and multiscopic display.

For illustration purposes only, there will now be described how the aforementioned backlight unit produces high brightness, namely how any wastage of light is minimised. In the backlight unit, a given light-emitting element is partially surrounded by a respective cavity reflector along a plane that is perpendicular to the optical axis of the backlight unit. This optical axis of the backlight unit essentially lies along an optical path of the backlight unit. The optical path of the backlight unit can also be referred to as the optical path (namely, an intended optical path) of the array of light-emitting elements. As an example, in a given coordinate space, if a Z axis represents the optical path of the backlight unit, the given light-emitting element is surrounded by the respective cavity reflector along an XY plane. Thus, the given light-emitting element is only partially surrounded by the respective cavity reflector, that is, along the XY plane. This allows the light emanating from the given light emitting element to travel towards the collimator, either directly or upon being reflected off a reflective surface of the respective cavity reflector.

Throughout the present disclosure, the term "cavity reflector" refers to a structure forming a cavity in which a light-emitting element is placed, wherein said structure has at least one reflective surface. In other words, a given cavity reflector has at least one reflective surface that surrounds a respective light-emitting element along the plane that is perpendicular to the optical axis of the backlight unit. The at least one reflective surface is aligned at an angle with respect to the optical axis of the backlight unit. Said angle could, for example, lie in a range of 25 degrees to 65 degrees; more optionally, in a range of 30 degrees to 60 degrees. As a result of such an alignment of the at least one reflective surface, a part of light emanating from the respective light-emitting element that is incident upon the at least one reflective surface is reflected towards the collimator.

It will be appreciated that said part of light could reflect multiple times before it exits the given cavity reflector. However, the shape of the cavity reflector (which is dependent on the shape of the at least one reflective surface and the alignment of the at least one reflective surface with respect to the optical axis) can be selected such that multiple reflections are minimised as much as possible. This may be implemented in combination with an optimised light emission profile of the light-emitting elements. In this regard, a light emission profile of the light-emitting elements may be designed such that at least a predefined percent (for example, 90 percent or more) of the light emanating from the light-emitting elements, when incident upon the at least one reflective surface, is reflected at an angle with respect to the optical axis (of the backlight unit) that is smaller than a predefined angle. The predefined angle may, for example, lie in a range of 1 degree to 10 degrees.

Moreover, the at least one reflective surface can be made with a high quality factor, such that the light reflects with minimal attenuation. In this regard, the at least one reflective surface can be at least one of:

(i) made of a highly reflective material (for example, such as metals like copper, silver, aluminium, or similar), (ii) made smooth and free from imperfections to minimize scattering losses, (iii) coated with a dielectric material to enhance reflectivity, reduce losses, and improve durability.

In some implementations, the at least one reflective surface comprises a single, continuous reflective surface. One example of such a reflective surface is a truncated-cone-shaped reflective surface. In other implementations, the at least one reflective surface comprises a plurality of reflective surfaces that are arranged one after another to form a partial enclosure. Said partial enclosure can be in a form of a truncated-cone-like cavity.

Pursuant to embodiments of the present disclosure, various different types of light-emitting elements can be employed in said array. Examples of the light-emitting elements include, but are not limited to, light-emitting diodes (LEDs), organic LEDs (OLEDs), mini LEDs, and micro LEDs. The collimator can be implemented as a lenslet array, a lenslet sheet, or similar. A lenslet array comprises a plurality of lenslets (namely, small, individual lenses) that are arranged in a form of a grid or some other pattern. A lenslet sheet also comprises a plurality of lenslets arranged in a form of a grid or some other pattern, but is typically more flexible than lenslet arrays. It will be appreciated that a size of a lenslet in a lenslet array or a lenslet sheet may depend on a size of the light-emitting elements. Such collimators are well-known in the art.

The first drive circuit is employed to individually control the light-emitting elements, based on the drive signals received from the controller. These drive signals may be either generated by the controller itself, or received by the controller (for example, from the processor of the aforementioned LCD device, or the at least one processor of the aforementioned system).

Optionally, the backlight unit further comprises a transparent diffuser arranged between the collimator and the array of light-emitting elements. A technical benefit of arranging the transparent diffuser between the collimator and the array of light-emitting elements is that the transparent diffuser spreads (namely, scatters) light incoming from the light-emitting elements (either directly or upon being reflected off reflective surfaces of the respective cavity reflectors) uniformly over a wide range of angles. As a result, over-lighting of areas inside the cavity reflectors as well as under-lighting of areas between adjacent cavity reflectors is avoided. Therefore, no darkish area is formed between adjacent light-emitting elements, during use. Moreover, even light rays that are incoming at a wide angle (with respect to the optical axis) are not wasted. It is noteworthy that without the diffuser, such light rays would be incident upon the collimator at the wide angle, and therefore, might not pass through the collimator at all.

The transparent diffuser could be specifically designed to have an optimised diffusion profile. Optionally, the transparent diffuser could have a wide circular diffraction angle. As an example, the transparent diffuser could have a Gaussian circular diffraction angle. Herein, the term "Gaussian circular diffraction angle" refers to an angular distribution of light intensity after the light has passed through the transparent diffuser, wherein the angular distribution follows a Gaussian function in a circularly symmetric pattern along the optical axis of the backlight unit. In other words, the light intensity falls off according to the Gaussian function, as a diffraction angle of the light (with respect to the optical axis) increases. This results in a relatively bright central area (over the light-emitting elements and the respective cavity reflectors) that gradually fades out, thereby providing a smooth transition and avoiding harsh edges or hotspots in the areas between the cavity reflectors. This allows to avoid the aforementioned under-lighting of the areas between the light-emitting elements and the aforementioned over-lighting of the areas inside the cavity reflectors.

Moreover, the backlight unit may further comprise additional components that are employed to re-direct and recycle light that gets reflected off away from the optical axis of the backlight unit. Optionally, in this regard, the backlight unit further comprises a brightness enhancement film arranged on the optical path of the array of light-emitting elements. The brightness enhancement film is beneficially arranged on the optical path after the collimator. A technical benefit of employing the brightness enhancement film is that it further enhances the brightness and efficiency of the backlight unit, during use. The brightness enhancement film controls the direction of light, such that a maximum amount of the light emanating from the light-emitting elements is redirected along the optical axis of the backlight unit. This is achieved through microstructures present on the brightness enhancement film; these microstructures refract and reflect light efficiently. The microstructures can be implemented as prismatic structures or microlenses.

Additionally, the brightness enhancement film can optionally recycle any light that is not directed along the optical axis, by reflecting it back towards the collimator, where it can be redirected and used more effectively. This minimises wastage of light, and allows to enhance an overall luminance of the LCD device without increasing power consumption of the backlight unit. It will be appreciated that the backlight unit could comprise more than one brightness enhancement film to optimise light management.

Furthermore, optionally, the backlight unit further comprises at least one reflecting polarizer arranged on the optical path of the array of light-emitting elements. The at least one reflecting polarizer is beneficially arranged on the optical path after the collimator. In a case where the backlight unit comprises the brightness enhancement film, the at least one reflecting polarizer can be arranged after the brightness enhancement film. The at least one reflecting polarizer can be implemented as a dielectric-coated polarizer.

A technical benefit of employing the at least one reflecting polarizer is that it allows for recycling light that would otherwise be absorbed and get wasted, thereby increasing the overall brightness and contrast in the LCD device. The at least one reflecting polarizer reflects light having a certain polarization state (for example, such as s-polarized light), while transmitting remaining light having another polarization state (for example, p-polarized light). Such a selective reflection and transmission is based on a polarization angle of the light incident upon the at least one reflecting polarizer. In this regard, the at least one reflecting polarizer has coatings or is made of materials with specific refractive indices to create constructive and destructive interference for certain polarization states. This interference results in the reflection of the light having the certain polarization state and the transmission of the light having the another polarization state. While the reflected light is directed back towards the transparent diffuser, the reflected light gets depolarized and at least a part of the reflected light is converted to light having the another polarization state. This depolarized light (now having both the certain polarization state and the another polarization state) is re-emitted from the backlight unit, and is filtered once again by the at least one reflecting polarizer, thereby allowing the part of the depolarized light having the another polarization state to pass through, while reflecting a remaining part of the depolarized light having the certain polarization state back for another cycle. In this way, recycling of the light increases the overall brightness of the backlight unit without requiring additional power consumption.

Moreover, optionally, the backlight unit further comprises at least one circular polarizer arranged on the optical path of the array of light-emitting elements. The at least one circular polarizer is beneficially arranged on the optical path after the collimator. In a case where the backlight unit comprises the brightness enhancement film, the at least one circular polarizer can be arranged after the brightness enhancement film.

Technical benefits of employing the at least one circular polarizer are that it manages light polarization to enhance contrast, display quality and performance, and viewing angles. In this regard, the at least one circular polarizer is employed to convert circularly-polarized light into linearly-polarized light. The at least one circular polarizer comprises a quarter-wave plate and a linear polarizer. When circularly-polarized light passes through the quarter-wave plate, it is converted into linearly-polarized light, which then passes through the linear polarizer, resulting in a specific polarization orientation. As a result, a significant part of the light emanating from the backlight unit has the specific polarization orientation. This light is suitable for use in the LCD device, because having the light in the specific polarization orientation allows for modulating said light by the at least one LC layer effectively.

It will be appreciated that the brightness enhancement film, the at least one reflecting polarizer and/or the at least one circular polarizer can be employed either alone or in any suitable combination. Moreover, an order in which these additional components (namely, the brightness enhancement film, the at least one reflecting polarizer and/or the at least one circular polarizer) need not be fixed, and can be selected to achieve a desired performance (for example, such as a specific polarization orientation or a specific polarization state) of the backlight unit.

The present disclosure also relates to the LCD device as described above. Various embodiments and variants disclosed above, with respect to the aforementioned first aspect, apply mutatis mutandis to the LCD device of the aforementioned second aspect.

Optionally, the first polarizer is implemented within the light-emitting elements of the backlight unit. A technical benefit of implementing the first polarizer within the light-emitting elements of the backlight unit is that a design of the LCD device is simplified, as the light emitted by the backlight unit has the first polarization orientation itself. This enhances the contrast in the LCD device, whilst improving the performance of the LCD device. This also allows for designing various components of the backlight unit (including the at least one reflecting polarizer and the at least one circular polarizer) accordingly to reduce wastage of light, thereby increasing the overall brightness in the LCD device.

As an example, the light-emitting elements can be implemented as LEDs having integrated polarizing filters, which allow the LEDs to emit polarized light. The polarizing filters can be linear polarizers that only allows light with the first polarization direction to pass through. As another example, the light-emitting elements can be implemented as LEDs with built-in polarizing elements, for example, such as nanostructures or gratings on an LED surface. These polarizing elements manipulate a polarization state of the emitted light.

In some implementations, the at least one LC layer comprises a single LC layer. Such implementations pertain to conventional LCD devices that are well-known in the art. In one embodiment, the LCD device is employed without any multiscopic optical element in a two-dimensional (2D) HUD, wherein the synthetic light field produced by the LCD device is used to present a 2D visual scene. In such a case, the drive signals (for controlling the plurality of LC cells of the at least one LC layer) can be generated based on a 2D image (of the 2D visual scene) to be presented. In another embodiment, the LCD device is employed with a multiscopic optical element in a 3D HUD, wherein the synthetic light field is used to present a 3D visual scene. Examples of the multiscopic optical element include, but are not limited to, a lenticular array and a parallax barrier. Such implementations of LCD devices are well-known in the art. Optionally, in such a case, the 3D HUD comprises tracking means, wherein the processor is configured to:

utilise the tracking means to determine a relative location of a first eye and of a second eye of at least one user with respect to an image plane of the LCD device; and generate or obtain a first virtual image and a second virtual image to be presented to the first eye and the second eye of the at least one user, respectively, based on the relative location of the first eye and of the second eye of the at least one user with respect to the image plane, wherein the drive signals are generated based on the first virtual image, the second virtual image, and the relative location of the first eye and of the second eye of the at least one user with respect to the image plane.

In other implementations, the at least one LC layer comprises a first LC layer and a second LC layer that are arranged between the first polarizer and the second polarizer, the second LC layer being arranged between the first LC layer and the second polarizer, wherein the first LC layer and the second LC layer have a gap therebetween. As the first polarizer is arranged between the backlight unit and the second polarizer, an order in which various components of the LCD device are arranged along the optical path is as follows:

---

Backlight unit -> first polarizer -> first LC layer ->
gap -> second LC layer -> second polarizer

---

In the aforesaid other implementations, the synthetic light field produced by the LCD device can be used to present a 3D visual scene in a 3D HUD, without a need for a multiscopic optical element. Optionally, in this regard, the 3D HUD comprises tracking means, wherein the processor is configured to:

utilise the tracking means to determine a relative location of a first eye and of a second eye of at least one user with respect to an image plane of the LCD device;

generate or obtain a first virtual image and a second virtual image to be presented to the first eye and the second eye of the at least one user, respectively, based on the relative location of the first eye and of the second eye of the at least one user with respect to the image plane; and when generating the drive signals, generate drive signals for LC cells of the first LC layer and LC cells of the second LC layer, based on the first virtual image, the second virtual image, and the relative location of the first eye and of the second eye of the at least one user with respect to the image plane, wherein the LC cells of the first LC layer and the LC cells of the second LC layer are controlled by the second drive circuit using the drive signals, to adjust a polarization of light passing therethrough, for producing a synthetic light field presenting the first virtual image and the second virtual image to the first eye and the second eye of the at least one user, respectively.

A technical benefit of incorporating such a stack of LC layers (namely, the first LC layer and the second LC layer) is that an autostereoscopic and multiscopic display can be produced without a need for a separate multiscopic optical element. This is made possible due to the gap between the first LC layer and the second LC layer, which leads to a parallax effect. Notably, different eyes of the at least one user (namely, different viewpoints) see virtual content through different LC cells in the first LC layer and the second LC layer, which enables to achieve autostereoscopy and multiscopy. This allows for presenting, to one or more users, high-resolution and artefact-free virtual content via the synthetic light field at high brightness and a relatively wide FOV. As there is no multiscopic optical element that unnecessarily and unintentionally blocks light emanating from the backlight unit to passthrough, the LCD device eliminates the problem of low brightness levels, which is encountered in conventional autostereoscopic displays (comprising multiscopic optical elements).

Moreover, the drive signals for controlling the LC cells of the first LC layer and the LC cells of the second LC layer are generated precisely and accurately based on the relative location of the first eye and of the second eye of the at least one user with respect to the image plane. This allows to not only eliminate the problem of crosstalk, but also widen viewing angles from which the at least one user can view the virtual content being presented. Furthermore, the LCD device can be leveraged to generate the virtual content at a relatively high resolution (for example, such as 60 pixels per degree or more) and at a relatively wide FOV.

It will be appreciated that the first virtual image and the second virtual image, when presented to the first eye and the second eye of the at least one user, respectively, correspond to a first part and a second part of the synthetic light field. As is well known, presenting slightly different virtual images (namely, slightly offset virtual images) to the eyes of the at least one user enables the at least one user to perceive depth in the virtual content being presented through these virtual images. This can be easily leveraged, to facilitate the multiscopic display in case of multiple users also.

Furthermore, optionally, the first LC layer is encased between a first substrate and a second substrate, the second LC layer is encased between a third substrate and a fourth substrate, an outer surface of the second substrate facing an outer surface of the third substrate, and wherein the LCD device further comprises an anti-reflection coating on at least one of: an outer surface of the first substrate that faces the first polarizer, the outer surface of the third substrate.

A technical benefit of employing the anti-reflection coating (on the at least one of: the outer surface of the first substrate, the outer surface of the third substrate) is that it prevents loss of light due to any reflection encountered (at the aforesaid surfaces) when the light is traversing along its optical path. Herein, an inner surface of a given substrate refers to a surface of the given substrate that is employed to encase a corresponding LC layer. Correspondingly, an outer surface of the given substrate refers to another surface of the given substrate that is opposite to the inner surface of the given substrate. As mentioned, the outer surface of the second substrate faces the outer surface of the third substrate. This means that an order in which the various components of the LCD device are arranged along the optical path is as follows:

---

Backlight unit -> first polarizer -> first substrate -> first LC layer ->
second substrate -> third substrate -> second LC layer -> fourth
substrate -> second polarizer

---

It will be appreciated that the aforesaid gap (between the first LC layer and the second LC layer) can be implemented as the second substrate and the third substrate, wherein there is no additional gap between the second substrate and the third substrate. Alternatively, the gap can be implemented as the second substrate, the third substrate and an additional gap between the second substrate and the third substrate. This additional gap can be filled with air or some other fluid. Alternatively, the additional gap can be implemented as a glass substrate or any other optically-transparent substrate.

Pursuant to embodiments of the present disclosure, the first polarizer and the second polarizer are linear polarizers. The first polarizer and the second polarizer are arranged on an optical path of the backlight unit. Light emitted by the backlight unit first passes through the first polarizer, and then the second polarizer. The first polarization orientation and the second polarization orientation can be implemented in various ways. Optionally, the first polarization orientation and the second polarization orientation are orthogonal to each other. As an example, one of the first polarizer and the second polarizer may be a vertically oriented polarizer having a vertical polarization orientation, while another of the first polarizer and the second polarizer may be a horizontally oriented polarizer having a horizontal polarization orientation. It will be appreciated that the first polarization orientation and the second polarization orientation are not limited to the vertical polarization orientation and the horizontal polarization orientation. It will also be appreciated that the first polarization orientation and the second polarization orientation need not be orthogonal to each other.

The first LC layer and the second LC layer may be made of a same LC material or different LC materials. Examples of such LC materials include, but are not limited to, twisted nematic (TN) LCs, TN LCs with positive or negative optical retardation (TN-PO or TN-NO), ferroelectric LCs (FLCs), and electrically controlled birefringence (ECB) LCs. LC molecules in a given LC layer (namely, the first LC layer or the second LC layer) can be oriented in an in-plane switching (IPS) arrangement or a vertical alignment (VA) arrangement. IPS and VA arrangements are well known in the art.

In some implementations, there is no colour filter array (CFA) in the LCD device. In such a case, the synthetic light field produced by the LCD device is monochrome. In other implementations, the LCD device further comprises a CFA that is arranged on the optical path of the backlight unit. In such implementations, the LC cells of the first LC layer and the LC cells of the second LC layer correspond to sub-pixels of a plurality of pixels. The CFA can be arranged anywhere on the optical path. Optionally, the CFA is arranged adjacent to the first LC layer or the second LC layer. By "adjacent", it is meant that the CFA is arranged either before or after a given LC layer (namely, the first LC layer or the second LC layer), and there is a negligible gap between the CFA and the given LC layer. A technical benefit of such an arrangement of the CFA is that there is no subpixel light leakage in the LCD device. This eliminates crosstalk and ghosting artefacts in the synthetic light field produced by the LCD device. More optionally, the CFA is arranged adjacent to the second LC layer, and between the second LC layer and the second polarizer. In such a case, a background of the second LC layer is monochrome, while a foreground of the second LC layer has the CFA.

Moreover, in some implementations, the image plane of the LCD device is an outermost surface of the LCD device from which the light emits. In other implementations, an optical combiner and/or other optical elements (for example, such as one or more mirrors, one or more lenses, or a combination thereof) may be arranged on an optical path between the LCD device and the at least one user. In such implementations, the image plane is an imaginary image plane.

The present disclosure further relates to the system as described above. Various embodiments and variants disclosed above, with respect to the aforementioned first aspect and the aforementioned second aspect, apply mutatis mutandis to the system of the aforementioned third aspect.

Optionally, the first polarizer is implemented within light-emitting elements of the backlight unit, as described earlier.

In an embodiment, the system further comprises tracking means and a multiscopic optical element, wherein the at least one processor is configured to:

utilise the tracking means to determine a relative location of a first eye and of a second eye of the at least one user with respect to an image plane of the LCD device;

generate a light field image for producing the synthetic light field, based on the relative location of the first eye and of the second eye with respect to the image plane of the LCD device, wherein the drive signals are generated based on the light field image; and control the multiscopic optical element, based on the relative location of the first eye and of the second eye with respect to the image plane of the LCD device, to direct light corresponding to a first set of pixels and a second set of pixels of the light field image to produce a first part and a second part of the synthetic light field, respectively, for the first eye and the second eye.

Examples of the multiscopic optical element include, but are not limited to, a lenticular array and a parallax barrier. The LCD device and the multiscopic optical element can be integrated together in a light field display unit. Moreover, in such implementations, the at least one LC layer comprises a single LC layer, wherein the system can be implemented as conventional 3D HUDs that are well-known in the art.

Throughout the present disclosure, the term "tracking means" refers to a specialised equipment for detecting and/or tracking a location of at least a first eye and a second eye of a given user. Optionally, the tracking means is implemented as at least one tracking camera. The at least one tracking camera may comprise at least one of: at least one visible-light camera, at least one infrared (IR) camera, at least one depth camera. Examples of such a visible-light camera include, but are not limited to, a Red-Green-Blue (RGB) camera, a Red-Green-Blue-Alpha (RGB-A) camera, a Red-Green-Blue-Depth (RGB-D) camera, a Red-Green-Blue-White (RGBW) camera, a Red-Yellow-Yellow-Blue (RYYB) camera, a Red-Green-Green-Blue (RGGB) camera, a Red-Clear-Clear-Blue (RCCB) camera, a Red-Green-Blue-Infrared (RGB-IR) camera, and a monochrome camera. Examples of such a depth camera include, but are not limited to, a Time-of-Flight (ToF) camera, a light detection and ranging (LiDAR) camera, a Red-Green-Blue-Depth (RGB-D) camera, a laser rangefinder, a stereo camera, a plenoptic camera, a ranging camera, a Sound Navigation and Ranging (SONAR) camera. It will be appreciated that any combination of various different types of cameras (for example, such as the at least one visible-light camera, the at least one IR camera and the at least one depth camera) may be utilised in the tracking means. When different types of images captured by the various different types of tracking cameras are utilised, the location of the user's eyes can be determined highly accurately, as results obtained from one type of image can be used to refine results obtained from another type of image. Herein, these different types of images constitute the tracking data collected by the tracking means, and may be in the form of at least one of: visible-light images, IR images, depth images. It will be appreciated that the tracking means tracks both eyes of the at least one user with a significantly high accuracy and precision, such that an error in determining the relative location may, for example, be minimised to within a tolerance range of approximately (+/−) 8 millimetres.

The at least one processor controls an overall operation of the system. The at least one processor is communicably coupled to the light field display unit and the tracking means. Optionally, the at least one processor is implemented as a processor of the light field display unit. Alternatively, optionally, the at least one processor is implemented as a processor of a computing device that is communicably coupled to the light field display unit. Examples of the computing device include, but are not limited to, a laptop, a desktop, a tablet, a phablet, a personal digital assistant, a workstation, and a console. Yet alternatively, optionally, the at least one processor is implemented as a cloud server (namely, a remote server) that provides a cloud computing service.

As mentioned earlier, the light field image is generated based on the relative location of the first eye and of the second eye of the at least one user with respect to the image plane of the LCD device. The light field image may be understood to be a 2D image comprising a plurality of pixels, wherein a first set of pixels from amongst the plurality of pixels is responsible for generating the first part of the synthetic light field that corresponds to the first eye, and a second set of pixels from amongst the plurality of pixels is responsible for generating the second part of the synthetic light field that corresponds to the second eye. It will be appreciated that the pixels belonging to the first set are not arranged in a continuous manner across the light field image; similarly, the pixels belonging to the second set are also not arranged in a continuous manner across the light field image. Optionally, the pixels belonging to the first set and the pixels belonging to the second set are arranged in alternating vertical stripes across a horizontal field of view of the light field image, wherein each vertical stripe comprises one or more scanlines of pixels. This is because humans perceive depth mainly based on horizontal binocular parallax. Thus, in this way, the light field image would be considerably different as compared to a conventional 2D image that is displayed via conventional 2D displays, because the same light field image would comprise visual information corresponding to the first eye as well as the second eye of the at least one user.

In this regard, the light field image can be generated from the first virtual image and the second virtual image that are to be presented to the first eye and the second eye, respectively. In some implementations, the at least one processor is configured to generate the first virtual image and the second virtual image from a perspective of the relative location of the first eye and of the second eye of the at least one user with respect to the image plane of the LCD device, by employing a 3D model of at least one virtual object. It will be appreciated that the relative location of the first eye and of the second eye with respect to the image plane indicate a viewing direction of the first eye and a viewing direction of the second eye, respectively. Therefore, the first virtual image and the second virtual image are generated based on these viewing directions. Hereinabove, the term "virtual object" refers to a computer-generated object (namely, a digital object). Examples of the at least one virtual object may include, but are not limited to, a virtual navigation tool, a virtual gadget, a virtual message, a virtual entity, a virtual entertainment media, and a virtual information. The term "three-dimensional model" of the at least one virtual object refers to a data structure that comprises comprehensive information pertaining to the at least one virtual object. Such a comprehensive information is indicative of at least one of: a plurality of features of the at least one virtual object or its portion, a shape and a size of the at least one virtual object or its portion, a pose of the at least one virtual object or its portion, a material of the at least one virtual object or its portion, a colour and an optical depth of the at least one virtual object or its portion. The 3D model may be generated in the form of a 3D polygonal mesh, a 3D point cloud, a 3D surface cloud, a voxel-based model, or similar. Optionally, the at least one processor is configured to store the 3D model at a data repository that is communicably coupled to the at least one processor. The data repository may be implemented as a memory of the at least one processor, a cloud-based database, or similar. In other implementations, the at least one processor is configured to obtain the first virtual image and the second virtual image in a form of 2D user interface (UI) elements. The 2D UI elements could pertain to, for example, a virtual navigation tool, a virtual gadget, a virtual message, a virtual entity, a virtual entertainment media, a virtual information, or similar.

Throughout the present disclosure, the term "synthetic light field" refers to a light field that is produced (namely, generated) synthetically by the LCD device (namely, the light field display unit), while the term "real-world light field" refers to a light field emanating from the real-world environment in which the at least one user is present. It will be appreciated that in case of the real-world light field, light from, for example, a natural light source (such as the Sun) and/or an artificial light source (such as a lamp, a bulb, a tube-light, or similar), are reflected off real-world objects (or their portions) to be incident towards the eyes of the at least one user. In this way, visual information (for example, such as colour information, optical depth information, and the like) pertaining to said real-world objects is typically perceived by the first eye and the second eye. On the other hand, in case of the synthetic light field, light emanating from the LCD device, upon reflecting off the optical combiner, is incident on the first eye and the second eye of the at least one user. In this way, visual information pertaining to the at least one virtual object can be perceived by the first eye and the second eye.

Optionally, the optical combiner is implemented by way of at least one of: a lens, a mirror, a semi-transparent mirror, a semi-transparent film, a semi-transparent flexible membrane, a prism, a beam splitter, an optical waveguide, a polarizer. Optical combiners are well-known in the art. Optionally, a tilt angle of the optical combiner with respect to the image plane of the LCD device (namely, the light field display unit) lies in a range of 10 degrees and 75 degrees.

In another embodiment, the system further comprises tracking means, wherein the at least one LC layer comprises a first LC layer and a second LC layer that are arranged between the first polarizer and the second polarizer, the second LC layer being arranged between the first LC layer and the second polarizer, wherein the first LC layer and the second LC layer have a gap therebetween, and wherein the at least one processor is configured to:

utilise the tracking means to determine the relative location of the first eye and of the second eye of the at least one user with respect to the image plane of the LCD device;

generate or obtain a first virtual image and a second virtual image to be presented to the first eye and the second eye of the at least one user, respectively, based on the relative location of the first eye and of the second eye of the at least one user with respect to the image plane of the LCD device; and when generating the drive signals, generate drive signals for controlling LC cells of the first LC layer and LC cells of the second LC layer, based on the first virtual image, the second virtual image, and the relative location of the first eye and of the second eye of the at least one user with respect to the image plane of the LCD device, wherein the synthetic light field presents the first virtual image and the second virtual image to the first eye and the second eye of the at least one user, respectively.

A technical benefit of incorporating such a stack of LC layers (namely, the first LC layer and the second LC layer) is that an autostereoscopic and multiscopic display can be produced without a need for a separate multiscopic optical element. This is made possible due to the gap between the first LC layer and the second LC layer, which leads to a parallax effect. Notably, different eyes of the at least one user (namely, different viewpoints) see virtual content through different LC cells in the first LC layer and the second LC layer, which enables to achieve autostereoscopy and multiscopy. This allows for presenting, to one or more users, high-resolution and artefact-free virtual content via the synthetic light field at high brightness and a relatively wide FOV. As there is no multiscopic optical element that unnecessarily and unintentionally blocks light emanating from the backlight unit to passthrough, the system eliminates the problem of low brightness levels, which is encountered in conventional 3D HUDs (comprising multiscopic optical elements).

Moreover, the drive signals for controlling the LC cells of the first LC layer and the LC cells of the second LC layer are generated precisely and accurately based on the relative location of the first eye and of the second eye of the at least one user with respect to the image plane. This allows to not only eliminate the problem of crosstalk, but also widen viewing angles from which the at least one user can view the virtual content being presented. Furthermore, the system can be leveraged to generate the virtual content at a relatively high resolution (for example, such as 60 pixels per degree or more) and at a relatively wide FOV. The system can be easily leveraged, to facilitate the multiscopic display in case of multiple users also.

There will now be described how the drive signals can be generated for the LC cells of the first LC layer and the LC cells of the second LC layer, based on the first virtual image, the second virtual image, and the relative location of the first eye and of the second eye of the at least one user with respect to the image plane.

In a first implementation, when generating the drive signals, the at least one processor is configured to:

for a given LC cell of the second LC layer, determine a first viewing direction and a second viewing direction from which the first eye and the second eye view the given LC cell of the second LC layer, respectively, based on a location of the given LC cell in the second LC layer, and the relative location of the first eye and of the second eye of the at least one user with respect to the image plane of the LCD device;

determine a first LC cell and a second LC cell of the first LC layer that lie along the first viewing direction and the second viewing direction, respectively;

determine a first pixel location of a given first pixel of the first virtual image, based on the first viewing direction and the relative location of the first eye with respect to the image plane of the LCD device;

determine a second pixel location of a given second pixel of the second virtual image, based on the second viewing direction and the relative location of the second eye with respect to the image plane of the LCD device;

fetch, from the first pixel location in the first virtual image, a first intensity value of the given first pixel of the first virtual image;

fetch, from the second pixel location in the second virtual image, a second intensity value of the given second pixel of the second virtual image; and generate respective drive signals for the given LC cell of the second LC layer, the first LC cell of the first LC layer and the second LC cell of the first LC layer, based on the first intensity value of the given first pixel of the first virtual image, and the second intensity value of the given second pixel of the second virtual image.

The aforementioned steps have been provided with respect to the given LC cell of the second LC layer. These steps can be performed in a similar manner for other LC cells of the second LC layer, to generate the drive signals for all the LC cells of the first LC layer and all the LC cells of the second LC layer.

An FOV that is provided by the LCD device to the at least one user can be determined, based on dimensions of the second LC layer and the relative location of the first eye and of the second eye of the at least one user with respect to the image plane of the LCD device. The first viewing direction and the second viewing direction from which the first eye and the second eye view (namely, see) the given LC cell of the second LC layer, respectively, can then be determined, based on the field of view provided by the LCD device and the location of the given LC cell in the second LC layer.

The first LC cell and the second LC cell of the first LC layer that lie along the first viewing direction and the second viewing direction, respectively, can then be determined, based on a width of the gap between the first LC layer and the second LC layer, a size of an LC cell in the first LC layer, and a size of an LC cell in the second LC layer (which may be same as or different from the size of the LC cell in the first LC layer). It will be appreciated that the LC cells of the first LC layer may or may not be aligned with the LC cells of the second LC layer. In a case where the LC cells of the first LC layer are not aligned with the LC cells of the second LC layer, the determination of the first LC cell and the second LC cell of the first LC layer (that lie along the first viewing direction and the second viewing direction, respectively) would also depend on a lateral shift in the alignment of the LC cells of the first LC layer with respect to the LC cells of the second LC layer.

The first pixel location of the given first pixel of the first virtual image can be determined by intersecting the first viewing direction with the image plane. For this purpose, the first viewing direction can be considered to be originating from the relative location of the first eye with respect to the image plane. The second pixel location of the given second pixel of the second virtual image can be determined in a similar manner.

The respective drive signals for the given LC cell of the second LC layer, the first LC cell of the first LC layer and the second LC cell of the first LC layer are then generated, based on the first intensity value of the given first pixel of the first virtual image, and the second intensity value of the given second pixel of the second virtual image. Such generation of the drive signals can be performed by solving linear equations, for example, as described in more detail below. It will also be appreciated that not only there will be linear equations corresponding to different LC cells of the second LC layer, but also there will be interdependencies in these linear equations. This is primarily due to a fact that a particular LC cell in the second LC layer is utilised to generate two different pixels per user (because both the eyes see light passing through that particular LC cell), while its corresponding LC cells in the first LC layer are also utilised to generate two different pixels per user (because both the eyes see light passing through these corresponding LC cells also).

Optionally, when generating the respective drive signals for the given LC cell, the first LC cell and the second LC cell, the at least one processor is configured to:

determine, based on the first intensity value, a first output angle to be generated between the second polarization orientation of the second polarizer and a polarization orientation of light incident upon the second polarizer after passing through the first LC cell and the given LC cell; and determine, based on the second intensity value, a second output angle to be generated between the second polarization orientation of the second polarizer and a polarization orientation of light incident upon the second polarizer after passing through the second LC cell and the given LC cell, wherein the respective drive signals for the given LC cell of the second LC layer, the first LC cell of the first LC layer and the second LC cell of the first LC layer are generated based on the first output angle and the second output angle.

An overall intensity of light passing through the second polarizer depends on an output angle between the second polarization orientation of the second polarizer and a polarization orientation of said light. This is based on a fact that a given polarizer only allows to pass through an entirety of light whose polarization orientation is same as a given polarization orientation of the given polarizer. As an example, if a stream of photons (namely, light) has a polarization orientation that makes an angle of 45 degrees from the given polarization orientation of the given polarizer, only half of the photons would pass through the given polarizer.

By determining the first output angle and the second output angle corresponding to the first intensity value and the second intensity value, respectively, individual drive signals for the given LC cell of the second LC layer, the first LC cell of the first LC layer and the second LC cell of the first LC layer can be generated by solving two linear equations. One of the two linear equations takes into account an angle of rotation by which the first LC cell of the first LC layer is to rotate the light passing therethrough and an angle of rotation by which the given LC cell of the second LC layer is to rotate the light passing therethrough, such that these angles of rotations result in the first output angle. Another of the two linear equations takes into account an angle of rotation by which the second LC cell of the first LC layer is to rotate the light passing therethrough and the angle of rotation by which the given LC cell of the second LC layer is to rotate the light passing therethrough, such that these angles of rotations result in the second output angle. These two linear equations are also interdependent on two other linear equations for two other LC cells of the second LC layer (corresponding to the first LC cell and the second LC cell of the first LC layer), which are again interdependent on other linear equations.

It will be appreciated here that gamma correction is optionally applied to the aforesaid intensity values, to adjust a brightness of the LCD device. Gamma correction make the brightness of the LCD device uniform, and is well known in the art.

Moreover, in some implementations, both the first LC layer and the second LC layer are configured to rotate the light passing therethrough in a same direction, namely, either clockwise or anti-clockwise. In such implementations, at least one of: the first LC layer, the second LC layer can be configured to have a full range of rotation of 0 to 180 degrees. It will be appreciated that such a configuration of the at least one of: the first LC layer, the second LC layer is physically possible to create, but is not commonly manufactured by conventional LCD manufacturers, because such a configuration is not required in conventional LCDs. Notably, a range of rotation of 0 to 90 degrees is sufficient for conventional LC displays, because an additional range of rotation of 90 to 180 degrees would simply re-produce same resulting light intensities that are already reproducible with the range of rotation of 0 to 90 degrees. Pursuant to the present disclosure, configuring the at least one of: the first LC layer, the second LC layer to have the full range of rotation of 0 to 180 degrees makes it possible to reach every single intensity value from an arbitrary starting orientation. In other words, if a single LC cell is configured to have a range of rotation of 0 to 90 degrees only, it is not possible to reach every single intensity value from an arbitrary starting orientation. As an example, in a worst-case scenario, if the first polarization orientation (of the first polarizer) and the second polarization orientation (of the second polarizer) are orthogonal to each other, and if the first LC cell in the first LC layer is controlled to rotate the polarization orientation of the light to 45 degrees, the given LC cell in the second LC layer can be controlled to reach a total rotation range of 45 to 135 degrees only. In such a case, the second LC layer can only add light (because 45 degrees is equivalent to medium grey, 90 degrees is equivalent to full intensity, and 135 degrees is equivalent to 45 degrees). Thus, configuring the first LC layer and the second LC layer to have the range of rotation of 0 to 90 degrees only would lead to an optimisation problem where it would be required to determine a combination of rotation angles for all LC cells in both the first LC layer and the second LC layer where all LC cells emit light of intended intensity values towards all viewing directions with a minimal error. Moreover, in such a case, there may be certain combinations of intensity values that may not be simply achievable.

In other implementations, at least one of: the first LC layer, the second LC layer is configured to rotate the light passing therethrough in any direction, namely, clockwise or anti-clockwise. In other words, the at least one of: the first LC layer, the second LC layer may rotate the light in a clockwise direction at a given time instant, and may rotate the light in an anti-clockwise direction at another given time instant. In such implementations, the first LC layer and the second LC layer can be configured to have a full range of rotation of 0 to 90 degrees only. However, at least one of: the first LC layer, the second LC layer can alternatively be configured to have a full range of rotation of 0 to 180 degrees. Configuring the at least one of: the first LC layer, the second LC layer to rotate the light in any direction (namely, clockwise and anti-clockwise at different time instants) makes it possible to reach every single intensity value from an arbitrary starting orientation. Optionally, in operation, a direction in which the given LC cell rotates the polarization orientation of the light is opposite to a direction in which at least one of: the first LC cell, the second LC cell rotates the polarization orientation of the light. This allows for simplifying the linear equations, thereby saving processing resources of the at least one processor. This also allows for achieving accurate colour reproduction according to the first virtual image and the second virtual image.

There will now be considered an example, for illustration purposes only, wherein: (i) the first polarization orientation (of the first polarizer) and the second polarization orientation (of the second polarizer) are orthogonal to each other, (ii) the first output angle to be generated between the second polarization orientation and the polarization orientation of the light incident upon the second polarizer after passing through the first LC cell and the given LC cell is 60 degrees (note that this angle can be on either side of the second polarization orientation), and (iii) the angle of rotation by which the first LC cell of the first LC layer rotates the light passing therethrough is 80 degrees with respect to the first polarization orientation (in other words, the polarization orientation of the light after passing through the first LC cell would make an angle of 10 degrees with respect to the second polarization orientation), and a direction of said rotation is clockwise. In such an example, the angle of rotation by which the given LC cell of the second LC layer rotates the light passing therethrough (to achieve the first output angle of 60 degrees) could be any one of: (i) 50 degrees or 110 degrees anti-clockwise, (ii) 70 degrees or 130 degrees clockwise.

In a second implementation, when generating the drive signals, the at least one processor is configured to:

for another given LC cell of the first LC layer, determine a third viewing direction and a fourth view-ing direction from which the first eye and the second eye view the another given LC cell of the first LC layer, respectively, based on a location of the another given LC cell in the first LC layer, and the relative location of the first eye and of the second eye of the at least one user with respect to the image plane of the LCD device;

determine a third LC cell and a fourth LC cell of the second LC layer that lie along the third viewing direction and the fourth viewing direction, respec-tively;

determine a third pixel location of a given third pixel of the first virtual image, based on the third viewing direction and the relative location of the first eye with respect to the image plane of the LCD device;

determine a fourth pixel location of a given fourth pixel of the second virtual image, based on the fourth viewing direction and the relative location of the second eye with respect to the image plane of the LCD device;

fetch, from the third pixel location in the first virtual image, a third intensity value of the given third pixel of the first virtual image;

fetch, from the fourth pixel location in the second virtual image, a fourth intensity value of the given fourth pixel of the second virtual image; and generate respective drive signals for the another given LC cell of the first LC layer, the third LC cell of the second LC layer and the fourth LC cell of the second LC layer, based on the third intensity value of the given third pixel of the first virtual image, and the fourth intensity value of the given fourth pixel of the second virtual image.

The aforementioned steps have been provided with respect to the another given LC cell of the first LC layer. These steps can be performed in a similar manner for other LC cells of the first LC layer, to generate the drive signals for all the LC cells of the first LC layer and all the LC cells of the second LC layer.

The third viewing direction and the fourth viewing direc-tion from which the first eye and the second eye view (namely, see) the another given LC cell of the first LC layer, respectively, can be determined, based on the FOV provided by the LCD device and the location of the another given LC cell in the first LC layer. It will be appreciated that the FOV provided by the LCD device can be determined as described earlier, because the width of the gap between the first LC layer and the second LC layer is negligible as compared to a distance between the LCD device and the eyes of the at least one user. The third LC cell and the fourth LC cell of the second LC layer that lie along the third viewing direction and the fourth viewing direction, respectively, can then be determined, based on the width of the gap between the first LC layer and the second LC layer, the size of the LC cell in the first LC layer, and the size of the LC cell in the second LC layer, as described earlier. The third pixel location of the given third pixel of the first virtual image can be determined by intersecting the third viewing direction with the image plane. The fourth pixel location of the given fourth pixel of the second virtual image can be determined in a similar manner.

The respective drive signals for the another given LC cell of the first LC layer, the third LC cell of the second LC layer and the fourth LC cell of the second LC layer are then generated, based on the third intensity value of the given third pixel of the first virtual image, and the fourth intensity value of the given fourth pixel of the second virtual image. Such generation of the drive signals can be performed by solving linear equations, for example, as described earlier. It will also be appreciated that not only there will be linear equations corresponding to different LC cells of the first LC layer, but also there will be interdependencies in these linear equations. This is primarily due to a fact that a particular LC cell in the first LC layer is utilised to generate two different pixels per user (because both the eyes see light passing through that particular LC cell), while its corresponding LC cells in the second LC layer are also utilised to generate two different pixels per user (because both the eyes see light passing through these corresponding LC cells also).

Optionally, when generating the respective drive signals for the another given LC cell, the third LC cell and the fourth LC cell, the at least one processor is configured to:

determine, based on the third intensity value, a third output angle to be generated between the second polar-ization orientation of the second polarizer and a polar-ization orientation of light incident upon the second polarizer after passing through the another given LC cell and the third LC cell; and determine, based on the fourth intensity value, a fourth output angle to be generated between the second polar-ization orientation of the second polarizer and a polar-ization orientation of light incident upon the second polarizer after passing through the another given LC cell and the fourth LC cell, wherein the respective drive signals for the another given LC cell, the third LC cell and the fourth LC cell are generated based on the third output angle and the fourth output angle.

By determining the third output angle and the fourth output angle corresponding to the third intensity value and the fourth intensity value, respectively, individual drive signals for the another given LC cell of the first LC layer, the third LC cell of the second LC layer and the fourth LC cell of the second LC layer can be generated by solving two linear equations. One of the two linear equations takes into account an angle of rotation by which the another given LC cell of the first LC layer is to rotate the light passing therethrough and an angle of rotation by which the third LC cell of the second LC layer is to rotate the light passing therethrough, such that these angles of rotations result in the third output angle. Another of the two linear equations takes into account an angle of rotation by which the another given LC cell of the first LC layer is to rotate the light passing therethrough and the angle of rotation by which the fourth LC cell of the second LC layer is to rotate the light passing therethrough, such that these angles of rotations result in the fourth output angle. These two linear equations are also interdependent on two other linear equations for two other LC cells of the first LC layer (corresponding to the third LC cell and the fourth LC cell of the second LC layer), which are again interdependent on other linear equations.

Moreover, in some implementations, both the first LC layer and the second LC layer are configured to rotate the light passing therethrough in a same direction, namely, either clockwise or anti-clockwise, as described earlier. In other implementations, at least one of: the first LC layer, the second LC layer is configured to rotate the light passing therethrough in any direction, namely, clockwise or anti-clockwise, as described earlier. Optionally, in operation, a direction in which the another given LC cell rotates the polarization orientation of the light is opposite to a direction in which at least one of: the third LC cell, the fourth LC cell rotates the polarization orientation of the light. This allows for simplifying the linear equations, thereby saving processing resources of the at least one processor. This also allows for achieving accurate colour reproduction according to the first virtual image and the second virtual image.

Furthermore, optionally, the first LC layer is encased between a first substrate and a second substrate, the second LC layer is encased between a third substrate and a fourth substrate, an outer surface of the second substrate facing an outer surface of the third substrate, and wherein the liquid crystal display device further comprises an anti-reflection coating on at least one of: an outer surface of the first substrate that faces the first polarizer, the outer surface of the third substrate. This has similar technical benefits and implementation, as described earlier in conjunction with the aforementioned second aspect.

Moreover, in some implementations, there is no CFA in the LCD device. In such a case, the synthetic light field produced by the LCD device is monochrome. In other implementations, the LCD device further comprises a CFA that is arranged on the optical path of the backlight unit. In such implementations, the LC cells of the first LC layer and the LC cells of the second LC layer correspond to sub-pixels of a plurality of pixels. The CFA can be arranged anywhere on the optical path. Optionally, the CFA is arranged adjacent to the first LC layer or the second LC layer. A technical benefit of such an arrangement of the CFA is that there is no subpixel light leakage in the LCD device. This eliminates crosstalk and ghosting artefacts in the synthetic light field produced by the LCD device. More optionally, the CFA is arranged adjacent to the second LC layer, and between the second LC layer and the second polarizer.

Furthermore, optionally, the system further comprises at least one additional LC layer arranged between the second LC layer and the second polarizer, wherein the second LC layer and the at least one additional LC layer have a gap therebetween, the at least one additional LC layer comprising a plurality of LC cells, wherein the at least one processor is configured to generate drive signals for the LC cells of the at least one additional LC layer also, based on the first virtual image, the second virtual image, and the relative location of the first eye and of the second eye of the at least one user with respect to the image plane of the LCD device. Optionally, in such a case, the CFA is arranged after an outermost LC layer (from amongst the at least one additional LC layer).

It will be appreciated that in some implementations, the at least one additional LC layer could include a single additional LC layer; in other implementations, the at least one additional LC layer could include a plurality of additional LC layers. In case of the plurality of additional LC layers, there is a gap between adjacent LC layers. A technical benefit of having such additional LC layer(s) is that the multiscopic display can be provided to multiple users simultaneously. This is made possible due to a fact that having the at least one additional LC layer allows for achieving accurate colour reproduction according to respective first virtual images and respective second virtual images of the multiple users. This prevents ghosting artifacts and crosstalk, and makes the system more robust.

It will be appreciated that the aforementioned first implementation and the aforementioned second implementation could be adjusted according to the number of the additional LC layer(s). As an example, when the at least one additional LC layer comprises a single additional LC layer, the aforementioned first implementation could be adjusted as follows. Optionally, when generating the drive signals, the at least one processor is configured to:

for the given LC cell of the second LC layer,
determine a fifth LC cell and a sixth LC cell of the at least one additional LC layer that lie along the first viewing direction and the second viewing direction, respectively, also; and
generate respective drive signals for the given LC cell of the second LC layer, the first LC cell of the first LC layer, the second LC cell of the first LC layer, the fifth LC cell of the at least one additional LC layer, and the sixth LC cell of the at least one additional LC layer, based on the first intensity value of the given first pixel of the first virtual image, and the second intensity value of the given second pixel of the second virtual image.

As another example, when the at least one additional LC layer comprises a single additional LC layer, the aforementioned second implementation could be adjusted as follows. Optionally, when generating the drive signals, the at least one processor is configured to:

for the another given LC cell of the first LC layer,
determine a seventh LC cell and an eighth LC cell of the at least one additional LC layer that lie along the third viewing direction and the fourth viewing direction, respectively, also; and
generate respective drive signals for the another given LC cell of the first LC layer, the third LC cell of the second LC layer, the fourth LC cell of the second LC layer, the seventh LC cell of the at least one additional LC layer, and the eighth LC cell of the at least one additional LC layer, based on the third intensity value of the given third pixel of the first virtual image, and the fourth intensity value of the given fourth pixel of the second virtual image.

DETAILED DESCRIPTION OF THE DRAWINGS

FIG. 1 is a cross-sectional view of a backlight unit 100 for a liquid crystal display (LCD) device, in accordance with an embodiment of the present disclosure. The backlight unit 100 comprises an array of light-emitting elements (depicted as light-emitting elements 102a-c), a plurality of cavity reflectors (depicted as cavity reflectors 104a-c), a collimator 106 arranged on an optical path of the array of light-emitting elements, a first drive circuit (not shown) that is employed to individually control the light-emitting elements of said array, and a controller (not shown). The controller is configured to generate or receive drive signals for controlling the light-emitting elements of said array, and send the drive signals to the first drive circuit.

Optionally, the backlight unit 100 further comprises a transparent diffuser 108 arranged between the collimator 106 and the array of light-emitting elements. Optionally, the backlight unit 100 further comprises a brightness enhancement film 110 arranged on the optical path of the array of light-emitting elements. Optionally, the backlight unit 100 further comprises at least one reflecting polarizer (depicted as a reflecting polarizer 112) arranged on the optical path of the array of light-emitting elements. Optionally, the backlight unit 100 further comprises at least one circular polarizer (depicted as a circular polarizer 114) arranged on the optical path of the array of light-emitting elements.

In FIG. 1, there are shown light rays 116a and 116b, which emanate from the light-emitting element 102b. When incident upon at least one reflective surface of the cavity reflector 104b, the light rays 116a and 116b are reflected towards the collimator 106, which aligns the light rays 116a and 116b along an optical axis Z of the backlight unit 100. For the sake of simplicity, only two light rays have been shown.

It may be understood by a person skilled in the art that FIG. 1 includes a simplified example implementation of the backlight unit 100, for sake of clarity, which should not unduly limit the scope of the claims herein. It is to be understood that the specific implementation of the backlight unit 100 is not to be construed as limiting to specific numbers or types of light-emitting elements, cavity reflectors, collimators, transparent diffusers, brightness enhancement films, reflecting polarizers and circular polarizers. A person skilled in the art will recognize many variations, alternatives, and modifications of embodiments of the present disclosure.

Figure 2A:
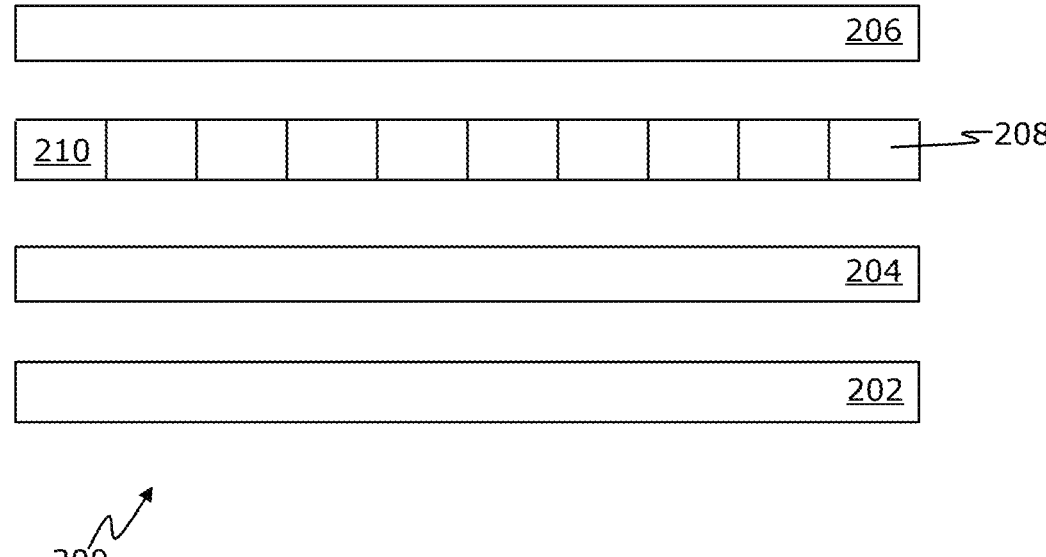
Figure 2B:
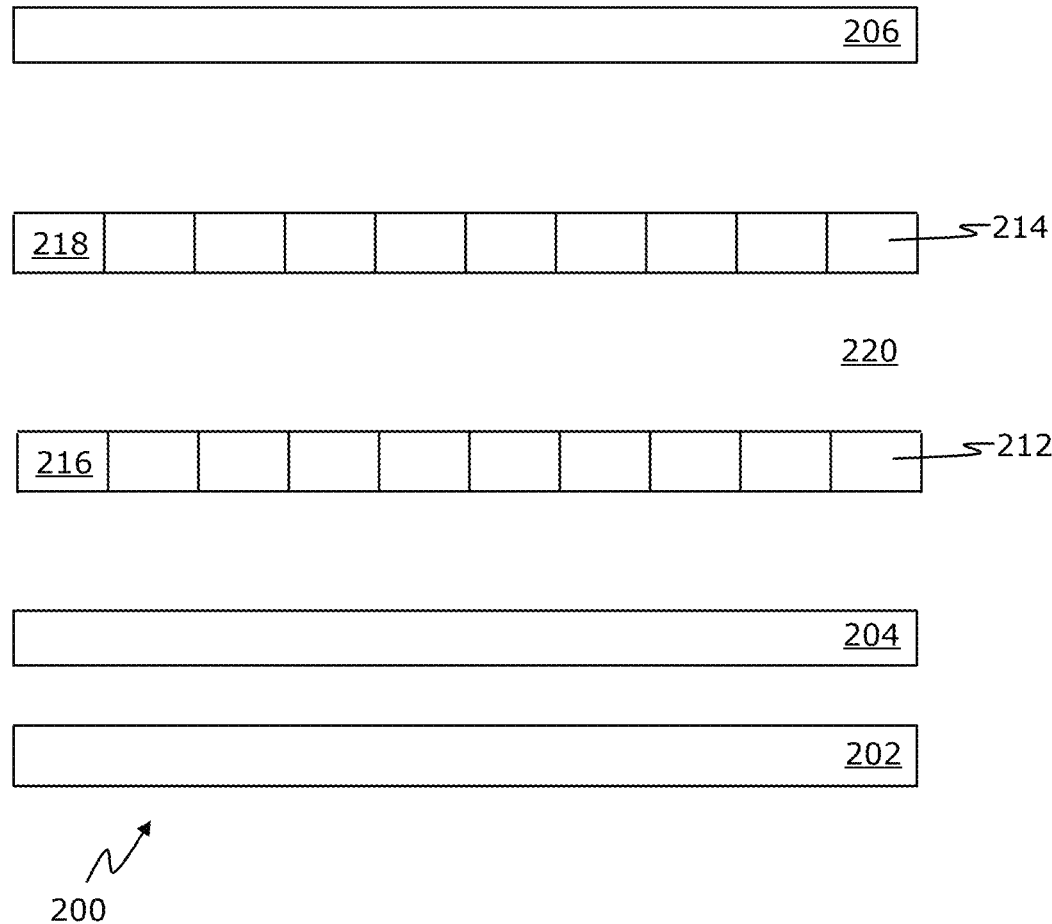

FIGS. 2A and 2B are cross-sectional views of an LCD device 200, in accordance with different embodiments of the present disclosure. In a first embodiment depicted in FIG. 2A, the LCD device 200 comprises a backlight unit 202, a first polarizer 204 and a second polarizer 206, at least one LC layer (depicted as a single LC layer 208), wherein the LC layer 208 comprises a plurality of LC cells 210 (depicted as separate boxes). The LCD device 200 further comprises a second drive circuit (not shown) that is employed to individually control the plurality of LC cells 210 of the LC layer 208, and a processor (not shown) configured to generate drive signals for controlling the plurality of LC cells 210 of the LC layer 208, and send the drive signals to the second drive circuit. The plurality of LC cells 210 of the LC layer 208 are controlled individually by the second drive circuit using the drive signals, to adjust a polarization of light passing therethrough, for producing a synthetic light field.

In a second embodiment depicted in FIG. 2B, the LCD device 200 comprises a backlight unit 202, a first polarizer 204 and a second polarizer 206, at least one LC layer (depicted as a first LC layer 212 and a second LC layer 214), wherein the first LC layer 212 comprises a plurality of LC cells 216 (depicted as separate boxes) and the second LC layer 214 comprises a plurality of LC cells 218 (depicted as separate boxes). There is a gap 220 between the first LC layer 212 and the second LC layer 214. The LCD device 200 further comprises a second drive circuit (not shown) that is employed to individually control the plurality of LC cells 216 of the first LC layer 212 and the plurality of LC cells 218 of the second LC layer 214, and a processor (not shown) configured to generate drive signals for controlling the plurality of LC cells 216 of the first LC layer 212 and the plurality of LC cells 218 of the second LC layer 214, and send the drive signals to the second drive circuit.

Figure 2C:
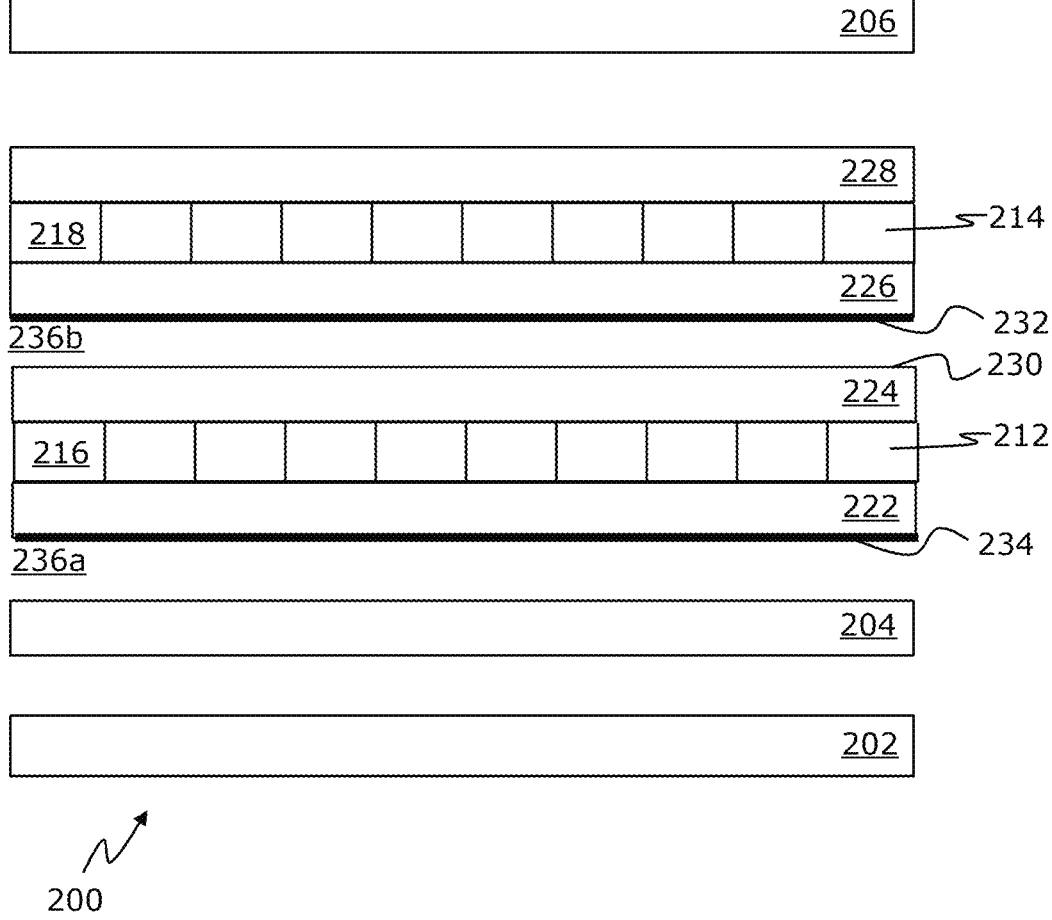
FIG. 2C depicts where in the LCD device an anti-reflection coating can be employed.

In FIG. 2C, there is shown that the first LC layer 212 is encased between a first substrate 222 and a second substrate 224, and the second LC layer 214 is encased between a third substrate 226 and a fourth substrate 228, wherein an outer surface 230 of the second substrate 224 faces an outer surface 232 of the third substrate 226. Said substrates are not shown in FIG. 2B, for the sake of clarity. Optionally, the LCD device 200 further comprises an anti-reflection coating on at least one of: an outer surface 234 of the first substrate 222 that faces the first polarizer 204, the outer surface 232 of the third substrate 226. With reference to FIG. 2C, there are shown anti-reflection coatings 236a and 236b on the outer surface 234 of the first substrate 222 and the outer surface 232 of the third substrate 226, respectively.

FIGS. 2A-2C are merely examples, which should not unduly limit the scope of the claims herein. A person skilled in the art will recognize many variations, alternatives, and modifications of embodiments of the present disclosure. For example, in the second embodiment depicted in FIGS. 2B-2C, there can be at least one additional LC layer, namely in addition to the first LC layer 212 and the second LC layer 214.

Figure 3:
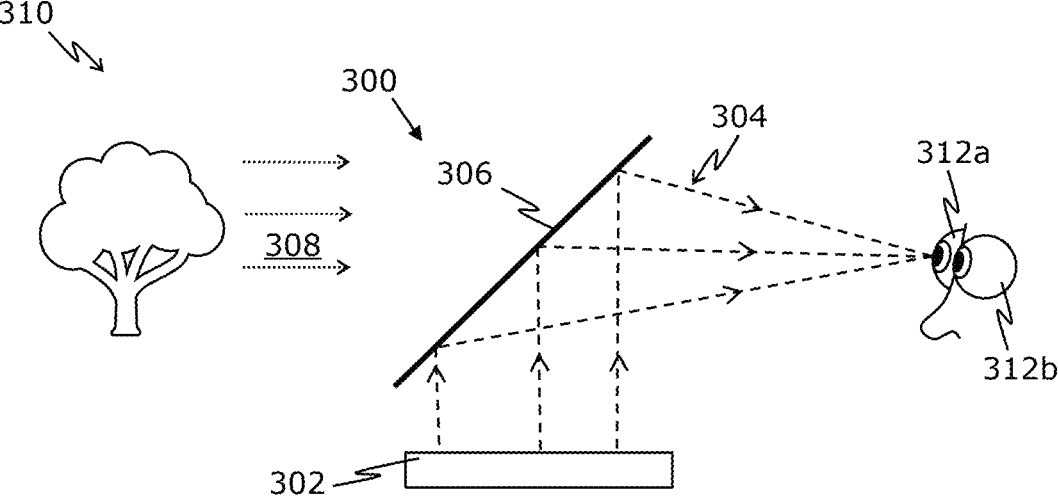
FIG. 3 depicts a system incorporating an LCD device for producing a synthetic light field, in accordance with an embodiment of the present disclosure.

FIG. 3 depicts a system 300 incorporating an LCD device 302 for producing a synthetic light field 304, in accordance with an embodiment of the present disclosure. The system 300 comprises the LCD device 302, which may be implemented according to the first embodiment depicted in FIG. 2A or the second embodiment depicted in FIG. 2B. The system 300 further comprises an optical combiner 306 arranged on an optical path of the LCD device 302 and on an optical path of a real-world light field 308 of a real-world environment 310, and at least one processor (not shown). The at least one processor is configured to generate drive signals for controlling a plurality of LC cells of at least one LC layer of the LCD device 302, and send the drive signals to a second drive circuit of the LCD device 302. The plurality of LC cells of the at least one LC layer are controlled individually by the second drive circuit using the drive signals, to adjust a polarization of light passing therethrough, for producing the synthetic light field 304. The optical combiner 306 is employed to reflect the synthetic light field 304 towards eyes 312a-b of at least one user, whilst optically combining the real-world light field 308 with the synthetic light field 304.

Figure 4A:
FIGS. 4A-4C depict how a system incorporating an LCD device works, in accordance with a specific embodiment of the present disclosure.
Figure 4A:
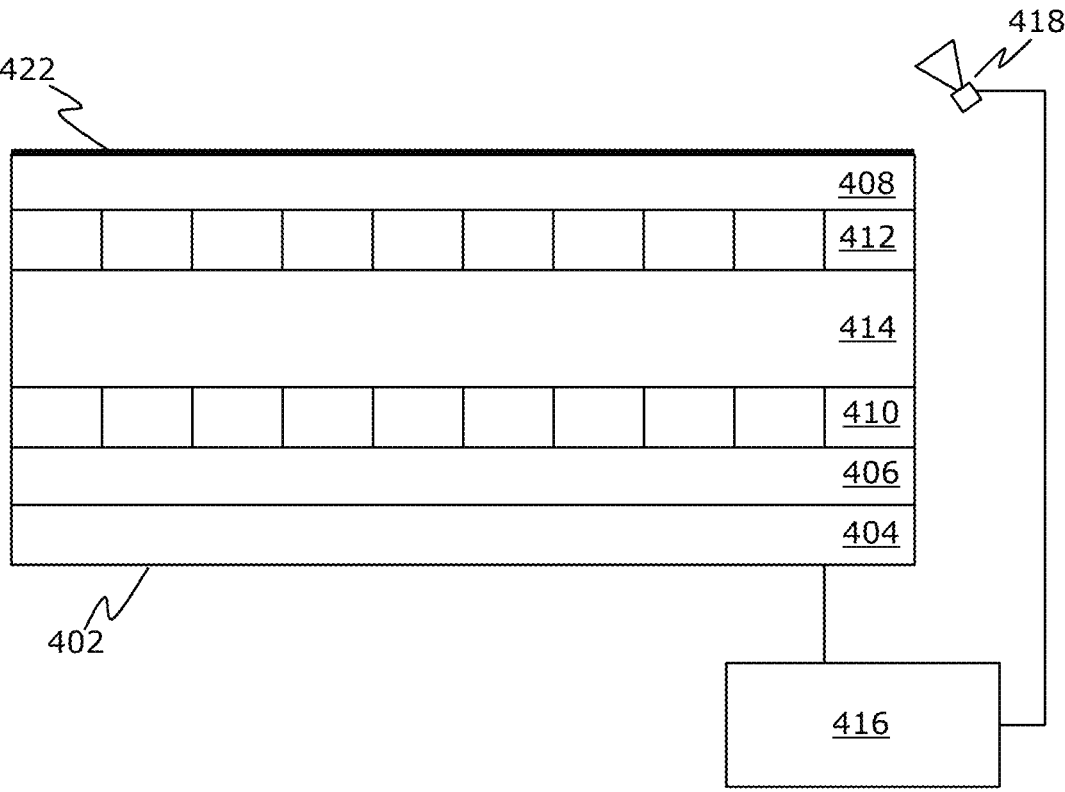
Figure 4B:
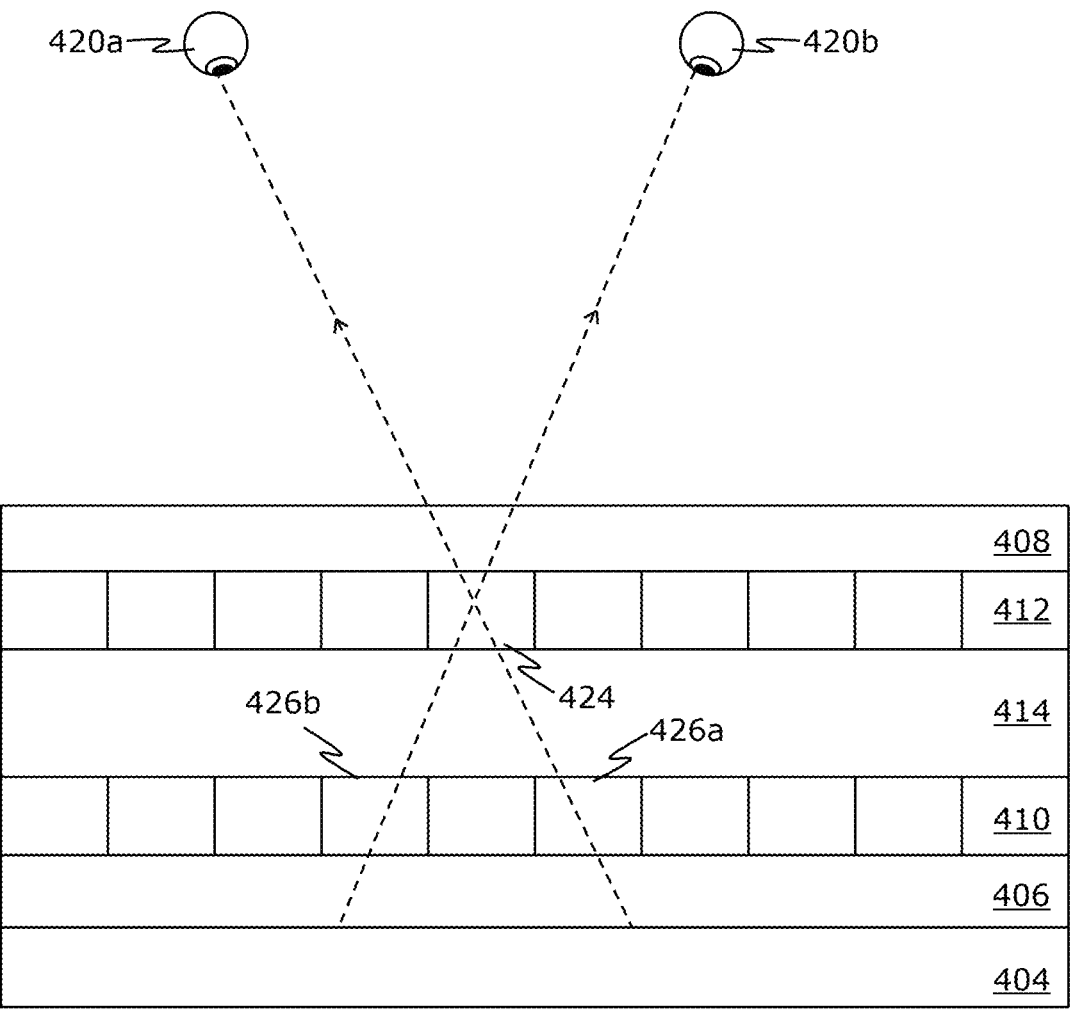
Figure 4C:
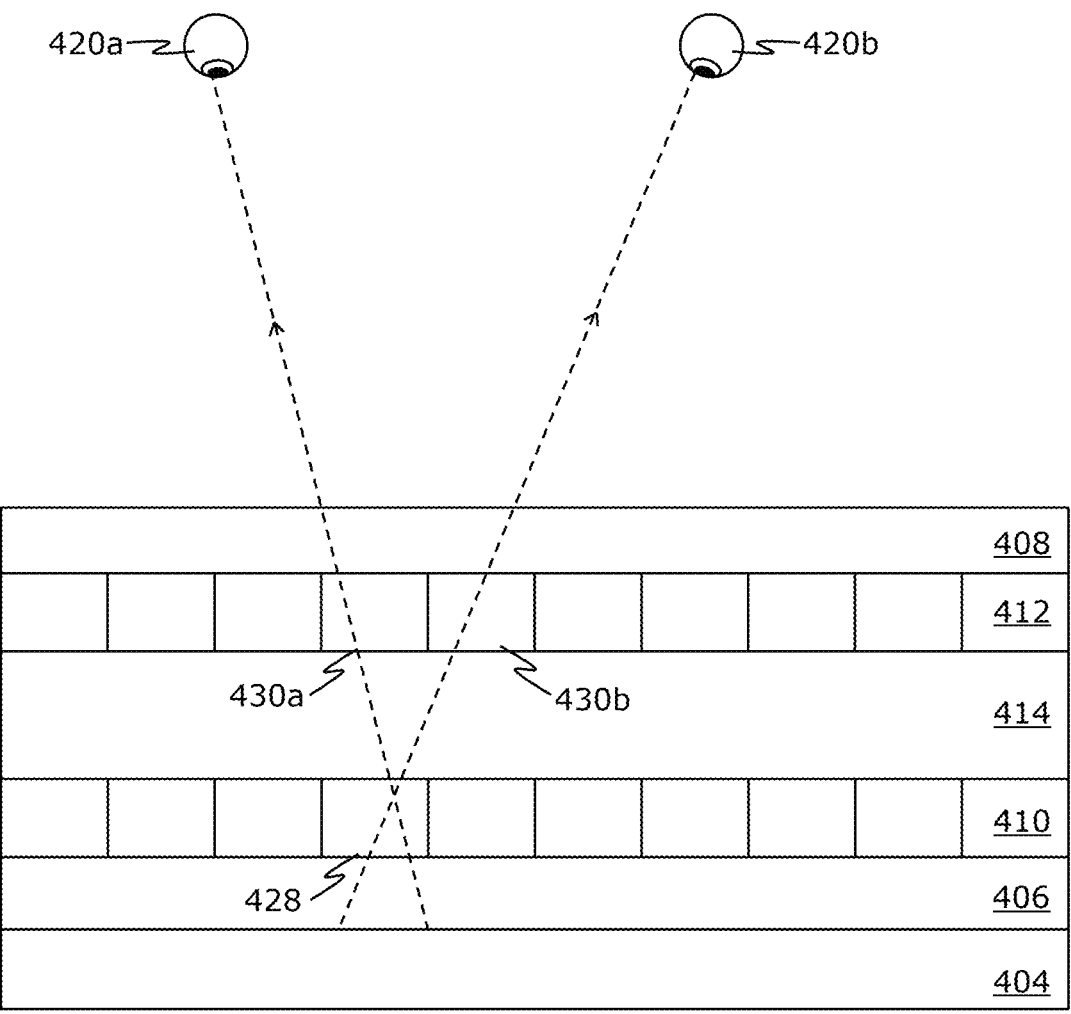

FIGS. 4A-4C depict how a system 400 incorporating an LCD device 402 works, in accordance with a specific embodiment of the present disclosure. The system 400 comprises the LCD device 402, which comprises a backlight unit 404, a first polarizer 406 and a second polarizer 408, at least one LC layer (depicted as a first LC layer 410 and a second LC layer 412). There is a gap 414 between the first LC layer 410 and the second LC layer 412. The system 400 further comprises an optical combiner (not shown, for the sake of simplicity), and at least one processor (depicted as a processor 416). The system 400 further comprises tracking means 418, wherein the processor 416 is configured to:

utilise the tracking means 418 to determine a relative location of a first eye 420a and of a second eye 420b of at least one user with respect to an image plane 422 of the LCD device 402;

generate or obtain a first virtual image and a second virtual image to be presented to the first eye 420a and the second eye 420b of the at least one user, respectively, based on the relative location of the first eye 420a and of the second eye 420b of the at least one user with respect to the image plane 422; and generate drive signals for controlling LC cells of the first LC layer 410 and LC cells of the second LC layer 412, based on the first virtual image, the second virtual image, and the relative location of the first eye 420a and of the second eye 420*b* of the at least one user with respect to the image plane 422.

The LCD device 402 further comprises a second drive circuit (not shown) that is employed to individually control the LC cells of the first LC layer 410 and LC cells of the second LC layer 412, using the drive signals. In this regard, the LC cells of the first LC layer 410 and the LC cells of the second LC layer 412 are controlled to adjust a polarization of light passing therethrough, for producing a synthetic light field presenting the first virtual image and the second virtual image to the first eye 420*a* and the second eye 420*b* of the at least one user, respectively.

Referring next to FIGS. 4B and 4C, there are illustrated different ways of achieving autostereoscopy and multiscopy using the system 400, in accordance with different implementations of the present disclosure. FIG. 4B depicts a first implementation, wherein when generating the drive signals, the processor 416 is configured to:

for a given LC cell 424 of the second LC layer 412, determine a first viewing direction and a second viewing direction from which the first eye 420*a* and the second eye 420*b* view the given LC cell 424 of the second LC layer 412, respectively, based on a location of the given LC cell 424 in the second LC layer 412, and the relative location of the first eye 420*a* and of the second eye 420*b* of the at least one user with respect to the image plane 422;

determine a first LC cell 426*a* and a second LC cell 426*b* of the first LC layer 410 that lie along the first viewing direction and the second viewing direction, respectively;

determine a first pixel location of a given first pixel of the first virtual image, based on the first viewing direction and the relative location of the first eye 420*a* with respect to the image plane 422;

determine a second pixel location of a given second pixel of the second virtual image, based on the second viewing direction and the relative location of the second eye 420*b* with respect to the image plane 422;

fetch, from the first pixel location in the first virtual image, a first intensity value of the given first pixel of the first virtual image;

fetch, from the second pixel location in the second virtual image, a second intensity value of the given second pixel of the second virtual image; and generate respective drive signals for the given LC cell 424 of the second LC layer 412, the first LC cell 426*a* of the first LC layer 410 and the second LC cell 426*b* of the first LC layer 410, based on the first intensity value of the given first pixel of the first virtual image, and the second intensity value of the given second pixel of the second virtual image.

FIG. 4C depicts a second implementation, wherein when generating the drive signals, the processor 416 is configured to:

for another given LC cell 428 of the first LC layer 410, determine a third viewing direction and a fourth viewing direction from which the first eye 420*a* and the second eye 420*b* view the another given LC cell 428 of the first LC layer 410, respectively, based on a location of the another given LC cell 428 in the first LC layer 410, and the relative location of the first eye 420*a* and of the second eye 420*b* of the at least one user with respect to the image plane 422;

determine a third LC cell 430*a* and a fourth LC cell 430*b* of the second LC layer 412 that lie along the third viewing direction and the fourth viewing direction, respectively;

determine a third pixel location of a given third pixel of the first virtual image, based on the third viewing direction and the relative location of the first eye 420*a* with respect to the image plane 422;

determine a fourth pixel location of a given fourth pixel of the second virtual image, based on the fourth viewing direction and the relative location of the second eye 420*b* with respect to the image plane 422;

fetch, from the third pixel location in the first virtual image, a third intensity value of the given third pixel of the first virtual image;

fetch, from the fourth pixel location in the second virtual image, a fourth intensity value of the given fourth pixel of the second virtual image; and generate respective drive signals for the another given LC cell 428 of the first LC layer 410, the third LC cell 430*a* of the second LC layer 412 and the fourth LC cell 430*b* of the second LC layer 412, based on the third intensity value of the given third pixel of the first virtual image, and the fourth intensity value of the given fourth pixel of the second virtual image.

It may be understood by a person skilled in the art that FIG. 4A-4C include a simplified example implementation of the system 400, for sake of clarity, which should not unduly limit the scope of the claims herein. It is to be understood that the specific implementation of the system 400 is not to be construed as limiting it to specific numbers or types of tracking means, polarizers, LC layers and processors. The person skilled in the art will recognize many variations, alternatives, and modifications of embodiments of the present disclosure. For example, the system 400 could further comprise at least one additional LC layer, wherein there is a gap between adjacent LC layers.

The invention claimed is:

1. A system comprising:
    a liquid crystal display (LCD) device comprising:
        a backlight unit;
        a first polarizer and a second polarizer having a first polarization orientation and a second polarization orientation, respectively, wherein the first polarizer is arranged between the backlight unit and the second polarizer;
        at least one liquid crystal (LC) layer arranged between the first polarizer and the second polarizer, the at least one LC layer comprising a plurality of LC cells; and
        a second drive circuit that is employed to individually control the plurality of LC cells of the at least one LC layer;
    an optical combiner arranged on an optical path of the liquid crystal display device and on an optical path of a real-world light field of a real-world environment;
    tracking means; and
    at least one processor configured to:
        generate drive signals for controlling the plurality of LC cells of the at least one LC layer; and
        send the drive signals to the second drive circuit,
    wherein the plurality of LC cells of the at least one LC layer are controlled individually by the second drive circuit using the drive signals, to adjust a polarization of light passing therethrough for producing a synthetic light field, and wherein the optical combiner is configured to reflect the synthetic light field towards eyes of at least one user, while optically combining the real-world light field with the synthetic light field;

wherein the at least one LC layer comprises a first LC layer and a second LC layer that are arranged between the first polarizer and the second polarizer, the second LC layer being arranged between the first LC layer and the second polarizer, and wherein the first LC layer and the second LC layer have a gap therebetween, wherein the at least one processor is further configured to:

utilise the tracking means to determine a relative location of a first eye and of a second eye of the at least one user with respect to an image plane of the LCD device;

generate or obtain a first virtual image and a second virtual image to be presented to the first eye and the second eye of the at least one user, respectively, based on the relative location of the first eye and of the second eye of the at least one user with respect to the image plane of the LCD device; and when generating the drive signals, generate drive signals for controlling LC cells of the first LC layer and LC cells of the second LC layer based on the first virtual image, the second virtual image, and the relative location of the first eye and of the second eye of the at least one user with respect to the image plane of the LCD device, wherein the synthetic light field presents the first virtual image and the second virtual image to the first eye and the second eye of the at least one user, respectively, and wherein, when generating the drive signals, the at least one processor is configured to:

for a given LC cell of the second LC layer, determine a first viewing direction and a second viewing direction from which the first eye and the second eye view the given LC cell of the second LC layer, respectively, based on a location of the given LC cell in the second LC layer and the relative location of the first eye and of the second eye of the at least one user with respect to the image plane of the LCD device;

determine a first LC cell and a second LC cell of the first LC layer that lie along the first viewing direction and the second viewing direction, respectively;

determine a first pixel location of a given first pixel of the first virtual image based on the first viewing direction and the relative location of the first eye with respect to the image plane of the LCD device;

determine a second pixel location of a given second pixel of the second virtual image based on the second viewing direction and the relative location of the second eye with respect to the image plane of the LCD device;

fetch, from the first pixel location in the first virtual image, a first intensity value of the given first pixel of the first virtual image;

fetch, from the second pixel location in the second virtual image, a second intensity value of the given second pixel of the second virtual image; and generate respective drive signals for the given LC cell of the second LC layer, the first LC cell of the first LC layer, and the second LC cell of the first LC layer based on the first intensity value of the given first pixel of the first virtual image and the second intensity value of the given second pixel of the second virtual image.

2. The system of claim 1, wherein the backlight unit comprises:

an array of light-emitting elements;

a plurality of cavity reflectors, wherein a given cavity reflector partially surrounds a corresponding light-emitting element of said array;

a collimator arranged on an optical path of the array of light-emitting elements;

a first drive circuit that is employed to individually control the light-emitting elements of said array; and a controller configured to:

generate or receive drive signals for controlling the light-emitting elements of said array; and send the drive signals to the first drive circuit.

3. The system of claim 2, further comprising a transparent diffuser arranged between the collimator and the array of light-emitting elements.

4. The system of claim 2, further comprising a brightness enhancement film arranged on the optical path of the array of light-emitting elements.

5. The system of claim 2, further comprising at least one reflecting polarizer arranged on the optical path of the array of light-emitting elements.

6. The system of claim 2, further comprising at least one circular polarizer arranged on the optical path of the array of light-emitting elements.

7. The system according to claim 1, wherein the at least one LC layer comprises a first LC layer and a second LC layer that are arranged between the first polarizer and the second polarizer, the second LC layer being arranged between the first LC layer and the second polarizer, wherein the first LC layer and the second LC layer have a gap therebetween.

8. The system according to claim 7, wherein the first LC layer is encased between a first substrate and a second substrate, the second LC layer is encased between a third substrate and a fourth substrate, an outer surface of the second substrate facing an outer surface of the third substrate, and wherein the liquid crystal display device further comprises an anti-reflection coating on at least one of: an outer surface of the first substrate that faces the first polarizer, the outer surface of the third substrate.

9. The system according to claim 1, wherein the first polarizer is implemented within light-emitting elements of the backlight unit.

10. The system of claim 1, further comprising a multiscopic optical element, wherein the at least one processor is configured to:

utilise the tracking means to determine a relative location of a first eye and of a second eye of at least one user with respect to an image plane of the LCD device;

generate a light field image for producing the synthetic light field, based on the relative location of the first eye and of the second eye with respect to the image plane of the LCD device, wherein the drive signals are generated based on the light field image; and control the multiscopic optical element, based on the relative location of the first eye and of the second eye with respect to the image plane of the LCD device, to direct light corresponding to a first set of pixels and a second set of pixels of the light field image to produce a first part and a second part of the synthetic light field, respectively, for the first eye and the second eye.

11. The system of claim 1, wherein when generating the respective drive signals for the given LC cell, the first LC cell and the second LC cell, the at least one processor is configured to:

determine, based on the first intensity value, a first output angle to be generated between the second polarization orientation of the second polarizer and a polarization orientation of light incident upon the second polarizer after passing through the first LC cell and the given LC cell; and determine, based on the second intensity value, a second output angle to be generated between the second polarization orientation of the second polarizer and a polarization orientation of light incident upon the second polarizer after passing through the second LC cell and the given LC cell, wherein the respective drive signals for the given LC cell of the second LC layer, the first LC cell of the first LC layer and the second LC cell of the first LC layer are generated based on the first output angle and the second output angle.

12. The system of claim 1, wherein when generating the drive signals, the at least one processor is configured to:

for another given LC cell of the first LC layer, determine a third viewing direction and a fourth viewing direction from which the first eye and the second eye view the another given LC cell of the first LC layer, respectively, based on a location of the another given LC cell in the first LC layer, and the relative location of the first eye and of the second eye of the at least one user with respect to the image plane of the LCD device;

determine a third LC cell and a fourth LC cell of the second LC layer that lie along the third viewing direction and the fourth viewing direction, respectively;

determine a third pixel location of a given third pixel of the first virtual image, based on the third viewing direction and the relative location of the first eye with respect to the image plane of the LCD device;

determine a fourth pixel location of a given fourth pixel of the second virtual image, based on the fourth viewing direction and the relative location of the second eye with respect to the image plane of the LCD device;

fetch, from the third pixel location in the first virtual image, a third intensity value of the given third pixel of the first virtual image;

fetch, from the fourth pixel location in the second virtual image, a fourth intensity value of the given fourth pixel of the second virtual image; and generate respective drive signals for the another given LC cell of the first LC layer, the third LC cell of the second LC layer and the fourth LC cell of the second LC layer, based on the third intensity value of the given third pixel of the first virtual image, and the fourth intensity value of the given fourth pixel of the second virtual image.

13. The system of claim 12, wherein when generating the respective drive signals for the another given LC cell, the third LC cell and the fourth LC cell, the at least one processor is configured to:

determine, based on the third intensity value, a third output angle to be generated between the second polarization orientation of the second polarizer and a polarization orientation of light incident upon the second polarizer after passing through the another given LC cell and the third LC cell; and determine, based on the fourth intensity value, a fourth output angle to be generated between the second polarization orientation of the second polarizer and a polarization orientation of light incident upon the second polarizer after passing through the another given LC cell and the fourth LC cell, wherein the respective drive signals for the another given LC cell, the third LC cell and the fourth LC cell are generated based on the third output angle and the fourth output angle.

14. The system of claim 1, wherein the first LC layer is encased between a first substrate and a second substrate, the second LC layer is encased between a third substrate and a fourth substrate, an outer surface of the second substrate facing an outer surface of the third substrate, and wherein the liquid crystal display device further comprises an anti-reflection coating on at least one of: an outer surface of the first substrate that faces the first polarizer, the outer surface of the third substrate.

15. The system of claim 1, further comprising a colour filter array arranged between the second LC layer and the second polarizer.

16. The system of claim 1, further comprising at least one additional LC layer arranged between the second LC layer and the second polarizer, wherein the second LC layer and the at least one additional LC layer have a gap therebetween, the at least one additional LC layer comprising a plurality of LC cells, wherein the at least one processor is configured to generate drive signals for the LC cells of the at least one additional LC layer, based on the first virtual image, the second virtual image, and the relative location of the first eye and of the second eye of the at least one user with respect to the image plane of the LCD device.

17. The system of claim 1, wherein the first polarizer is implemented within light-emitting elements of the backlight unit.

* * * * *